(12) United States Patent
Gao et al.

(10) Patent No.: US 12,286,765 B2
(45) Date of Patent: Apr. 29, 2025

(54) SINGLE-HOLE ULTRASONIC DETECTION DEVICE FOR CONTINUOUS INTEGRITY AND ROCK ENTRY DEPTH OF CONCRETE DIAPHRAGM WALL AND METHOD USING THE SAME

(71) Applicant: Jiangxi Academy of Water Science and Engineering, Nanchang (CN)

(72) Inventors: Jianglin Gao, Nanchang (CN); Da Liu, Nanchang (CN); Songtao Hu, Nanchang (CN); Yan Li, Nanchang (CN); Fang Chen, Nanchang (CN); Hongyou Guo, Nanchang (CN); Liang Sun, Nanchang (CN); Jianqing Zhang, Nanchang (CN)

(73) Assignee: Jiangxi Academy of Water Science and Engineering, Nanchang (CN)

( * ) Notice: Subject to any disclaimer, the term of this patent is extended or adjusted under 35 U.S.C. 154(b) by 354 days.

(21) Appl. No.: 18/094,949

(22) Filed: Jan. 9, 2023

(65) Prior Publication Data
US 2023/0265627 A1    Aug. 24, 2023

(30) Foreign Application Priority Data
Feb. 24, 2022    (CN) .......................... 202210173135.2

(51) Int. Cl.
*E02D 5/18* (2006.01)
*G01N 29/04* (2006.01)
(52) U.S. Cl.
CPC .............. *E02D 5/18* (2013.01); *G01N 29/043* (2013.01); *G01N 2291/0232* (2013.01)

(58) Field of Classification Search
CPC ........ E02D 5/18; G01N 29/043; G01N 29/07; G01N 29/09; G01N 29/221; G01N 29/4481; G01N 29/28; G01N 29/4454; G01N 2291/0289; G01N 2291/018; G01N 2291/101; G01N 2291/0258; G01B 17/00
USPC .......................................................... 73/598
See application file for complete search history.

(56) References Cited

U.S. PATENT DOCUMENTS

| 5,003,516 | A | * | 3/1991 | Sato | ....................... | G10K 11/30 |
| | | | | | | 29/25.35 |
| 5,094,108 | A | * | 3/1992 | Kim | ....................... | G10K 11/32 |
| | | | | | | 73/632 |
| 6,298,726 | B1 | * | 10/2001 | Adachi | ................ | G01N 29/343 |
| | | | | | | 73/632 |

(Continued)

*Primary Examiner* — Jacques M Saint Surin
(74) *Attorney, Agent, or Firm* — Patterson + Sheridan, LLP

(57) ABSTRACT

A single-hole ultrasonic detection device for continuous integrity and a rock entry depth of a concrete diaphragm wall and a method using the same are provided. the single-hole ultrasonic detection device includes an apparatus host, an ultrasonic transducer and an ultrasonic signal feedback device, and the apparatus host is respectively connected to the ultrasonic transducer and the ultrasonic signal feedback device via a corresponding one of signal lines, the apparatus host includes an ultrasonic transmitter and an ultrasonic signal collector, the ultrasonic transmitter is configured to generate ultrasonic waves and the ultrasonic waves are transmitted via the ultrasonic transducer, the ultrasonic transducer is configured to collect and recover a reflected wave of the ultrasonic waves, convert signals of the reflected wave of the ultrasonic waves into electric signals, and send the electric signals back into the apparatus host.

8 Claims, 4 Drawing Sheets

(56) References Cited

U.S. PATENT DOCUMENTS 6,584,847 B1 * 7/2003 Hirose .................... G01V 1/00
  73/598
11,275,192 B2 * 3/2022 Hu .......................... G01V 1/42

* cited by examiner

SINGLE-HOLE ULTRASONIC DETECTION DEVICE FOR CONTINUOUS INTEGRITY AND ROCK ENTRY DEPTH OF CONCRETE DIAPHRAGM WALL AND METHOD USING THE SAME

CROSS REFERENCE TO RELATED APPLICATION

This patent application claims the benefit and priority of Chinese Patent Application No. 202210173135.2, entitled "SINGLE-HOLE ULTRASONIC DETECTION DEVICE FOR CONTINUOUS INTEGRITY AND ROCK ENTRY DEPTH OF CONCRETE DIAPHRAGM WALL AND METHOD USING THE SAME" filed on Feb. 24, 2022, the disclosure of which is incorporated by reference herein in its entirety as part of the present application.

TECHNICAL FIELD

The present invention relates to the field of quality detection for a diaphragm wall construction in hydraulic engineering, and in particular, to a single-hole ultrasonic detection device for continuous integrity and a rock entry depth of a concrete diaphragm wall and a method using the same.

BACKGROUND ART

The concrete diaphragm wall has the advantages of reliable diaphragm performance, bearing large water head, and strong adaptation to formation conditions. So, it is widely applied in the dam diaphragm reinforcement engineering. In order to ensure the whole diaphragm reinforcement effect, there are strict requirements on the continuity integrity and the rock entry depth of a wall in engineering design. The diaphragm wall belongs to a hidden underground engineering. Due to complex and varied formation conditions, defects such as wall faultage, mud inclusions, excessive sediment on the bottom of the wall, and insufficient rock entry depth are easily generated in practical construction processes, thereby affecting the diaphragm reinforcement effect, and causing potential safety hazards of the engineering. Therefore, that the continuous integrity of a concrete diaphragm wall is accurately detected and the rock entry depth is determined are of great significance for enhancing construction quality control and ensuring the security of reinforcement engineering.

Due to the limitations of a detection method and a detection technology, for the detection of the continuous integrity and the rock entry depth of the concrete diaphragm wall, there is currently no detection method capable of simultaneously achieving both the continuous integrity and the rock entry depth of a wall. For the quality detection of the wall entity after the wall is formed, a commonly used detection method at present is a drilling and coring method, and the continuous integrity condition of a wall is reflected by a taken core sample. The detection effect of this method on the continuous integrity depends on the coring ratio of the core sample. A high coring ratio means that a greater economic and time cost needs to be input, and the wall quality condition of a missing position of the core sample cannot be reflected. For detection of the rock entry depth, since it is impossible to foresee the location of the boundary between the soil and the rock, it is necessary to drill holes at an outer side of the wall to detect the bedrock surface at the same time, which increases the detection workload in a multiplicative manner and consumes time and energy.

SUMMARY

The objective of the present disclosure is to provide a single-hole ultrasonic detection device for continuous integrity and a rock entry depth of a concrete diaphragm wall and a method using the same, for identifying the continuous integrity of the concrete anti-penetration wall and calculating the rock entry depth of the bottom of the wall.

The present disclosure provides a single-hole ultrasonic detection device for continuous integrity and a rock entry depth of a concrete diaphragm wall.

The single-hole ultrasonic detection device includes an apparatus host, an ultrasonic transducer and an ultrasonic signal feedback device, wherein the apparatus host is respectively connected to the ultrasonic transducer and the ultrasonic signal feedback device via a corresponding one of signal lines, the apparatus host is configured as an ultrasonic transmission and reception device, the ultrasonic transmission and reception device includes an ultrasonic transmitter and an ultrasonic signal collector, the ultrasonic transmitter is configured to generate ultrasonic waves and the ultrasonic waves are transmitted via the ultrasonic transducer, the ultrasonic transducer is configured to collect and recover a reflected wave of the ultrasonic waves, convert signals of the reflected wave of the ultrasonic waves into electric signals, and send the electric signals back into the ultrasonic transmission and reception device, the ultrasonic signal feedback device performs analysis and calculation by identifying the reflected wave of the ultrasonic waves to obtain an acoustic impedance value of a target medium, so as to identify information of an encountered medium during a propagation of the ultrasonic waves.

In embodiments, the ultrasonic transducer may be provided with an ultrasonic flat probe, and a front of the ultrasonic flat probe may be provided with an acoustic lens with a cylindrical surface.

In embodiments, the apparatus host may include three sockets, which includes a transmission and reception socket CH1, a data feedback socket CH2 and a charging socket CH3, the ultrasonic transducer may be connected to the apparatus host through a first signal line of the signal lines via the transmission and reception socket CH1, and the ultrasonic signal feedback device may be connected to the apparatus host through a second signal line of the signal lines via the data feedback socket CH2, a signal collected by the apparatus host may be transmitted into the ultrasonic signal feedback device through the data feedback socket CH2, so as to realize calculation, analysis, storage and display functions of a sound pressure, an acoustic impedance and a waveform signal, wherein the apparatus host may be connected to a charger via the charging socket CH3 to realize a power supply of the apparatus host.

The present disclosure provides a single-hole ultrasonic detection method for continuous integrity and a rock entry depth of a concrete diaphragm wall.

The single-hole ultrasonic detection method being carried out by the single-hole ultrasonic detection device described above, and the method includes the following steps.

Drilling an inspection hole on a top of the concrete diaphragm wall.

Injecting a conducting medium into the inspection hole to ensure that an interior of the inspection hole is fully filled with the conducting medium.

Connecting the apparatus host with the ultrasonic transducer and the ultrasonic signal feedback device respectively via the corresponding one of signal lines, and placing the ultrasonic transducer into the inspection hole slowly; marking scales on the signal lines previously by a tape, as lowering the ultrasonic transducer from an orifice to a bottom of the inspection hole; locating a ultrasonic flat probe, which included in the ultrasonic transducer, at a central position in the inspection hole, so as to ensure that an emission direction of the ultrasonic waves is perpendicular to a longitudinal axis of the concrete diaphragm wall; pausing the lowering once every 10-20 cm, performing excitation and identification of the ultrasonic waves, and calculating and analyzing the acoustic impedance value Zi of the target medium in each pause by means of the ultrasonic signal feedback device; and storing data after collecting the acoustic impedance value.

Calculating collected and reflected echo signals by the ultrasonic signal feedback device, and analyzing the acoustic impedance value Zi of the target medium in each pause, judging the continuity integrity of the concrete diaphragm wall based on a change of a sound pressure of a primary echo along with a change of the rock entry depth, and determining a position of a bedrock surface at a side of the concrete diaphragm wall based on whether a sound pressure of a secondary echo suddenly changes, determining a depth to a bottom of the concrete diaphragm wall based on whether to generate the secondary echo, and determining the continuous integrity and the rock entry depth of the concrete diaphragm wall.

Importing the acoustic impedance value Zi of the target medium stored in the ultrasonic signal feedback device into an analysis software included in the ultrasonic signal feedback device, and performing a deep analysis by means of the analysis software.

In embodiments, the conducting medium is water.

In embodiments, calculating a relational expression of an acoustic impedance of a medium at the side of the concrete diaphragm wall and the sound pressure of the primary echo, the sound pressure of the secondary echo, or another relational expression of the acoustic impedance of the medium at the side of the concrete diaphragm wall and a ratio of the sound pressure of the primary echo to the sound pressure of the secondary echo, based on acoustic impedances of both water and concrete that are predetermined values; wherein a sound pressure detected by the single-hole ultrasonic device is determined by, $$P = \sqrt{\frac{1}{N}\sum_{n=1}^{N}x^2(n)}$$

P is a value of the sound pressure detected by the single-hole ultrasonic detection device, N is a number of time domain sampling points, and x(n) is a standardized value of the time domain sampling points.

The acoustic impedance value is determined by $$Z_i = \rho_i c_i$$

A sound pressure of the reflected wave of the ultrasonic waves is determined by $$P_r = P_0 \frac{Z_2 - Z_1}{Z_2 + Z_1}$$

A sound pressure of a transmitted wave of the ultrasonic waves is determined by $$P_t = P_0 \frac{2Z_2}{Z_2 + Z_1}$$

$P_r$ is a value of the sound pressure of the reflected wave, Pt is a value of the sound pressure of the transmitted wave, $P_0$ is a sound pressure value of an incident wave, $Z_1$ is an acoustic impedance of a medium before being incident, $Z_2$ is an acoustic impedance of the medium after being incident, ρ is a density of a propagation medium, and c is a wave velocity of the propagation medium.

based on the sound pressure value of the incident wave $P_0$ and a value $P_1$ of the sound pressure of the primary echo collected, calculating and obtaining an acoustic impedance of the primary echo at each stage of medium propagation by $$Z_{i1} = \frac{P_0 + P_1}{P_0 - P_1}Z_W$$

$Z_{i1}$ is a value of the acoustic impedance of the primary echo.

based on the sound pressure value of the incident wave $P_0$ and a value $P_2$ of the sound pressure of the secondary echo collected at each stage, calculating and obtaining an acoustic impedance of the secondary echo at each stage of ultrasonic wave propagation by $$Z_{i2} = \left[\frac{4P_0 Z_W Z_C + P_2(Z_W + Z_C)^2}{4P_0 Z_W Z_C - P_2(Z_W + Z_C)^2}\right]Z_C$$

$Z_{i2}$ is a value of the acoustic impedance of the secondary echo, $P_0$ is the sound pressure value of the incident wave, $P_2$ is the value of the sound pressure of the secondary echo measured by the single-hole ultrasonic detection device, $Z_W$ is an acoustic impedance of the water, and $Z_C$ is an acoustic impedance of the concrete.

identifying the continuity integrity of the concrete diaphragm wall based on the sound pressure of the primary echo; determining a position of a soil medium interface at the side of the concrete diaphragm wall based on whether the sound pressure of the secondary echo suddenly changes, determining a position of the bottom of the concrete diaphragm wall based on whether to generate the second echo, and calculating the rock entry depth by $$|Z_{i+1} - Z_i| \geq \varepsilon$$

$$L_r = L_0 - L_i$$

ε is an impedance change threshold selected based on a medium impedance value and field experience; $L_r$ is the rock entry depth of the concrete diaphragm wall, $L_0$ is a depth of the concrete diaphragm wall without the secondary echo, and $L_i$ is a depth of the concrete diaphragm wall under a sudden change of the secondary echo.

Beneficial effects of the present disclosure are as follows.

In embodiments of the present disclosure, by drilling the inspection hole in the diaphragm wall, the object of detecting continuous integrity and rock entry depth of the wall can be achieved at the same time by collection for one time. The ultrasonic waves are excited in the inspection hole by the ultrasonic transmission and reception device and the ultrasonic transducer. The sound pressures of the ultrasonic waves reflected back are collected and recovered by the ultrasonic transducer and the ultrasonic signal collector. Analysis is performed by identifying a reflected echo signal via the ultrasonic signal feedback device to calculate and obtain a sound resistance parameter thereof, thereby identifying medium information encountered during the propagation of the ultrasonic waves. Accordingly, the continuous integrity of the concrete diaphragm wall is estimated and the rock entry depth is calculated.

Figure 1:
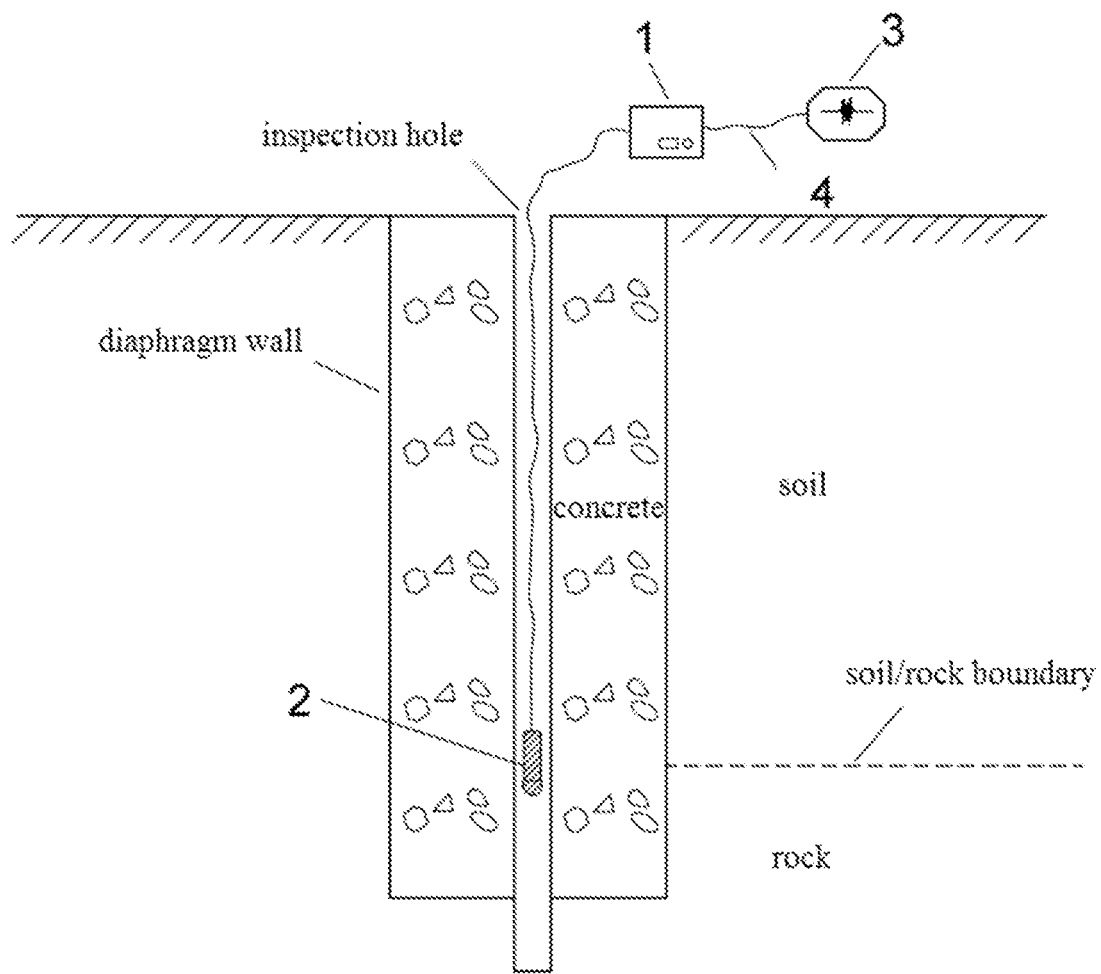
FIG. 1 is a schematic structural diagram of a single-hole ultrasonic detection device for continuous integrity and a rock entry depth of a concrete diaphragm wall arranged in the concrete diaphragm wall according to embodiments of the present disclosure.

List of reference characters: 1 apparatus host, 2 ultrasonic transducer, 3 ultrasonic signal feedback device, 4 signal line, 5 charger, 6 ultrasonic signal collector, 7 ultrasonic transmitter, 8 ultrasonic flat probe, and 9 acoustic lens with a cylindrical surface.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

EMBODIMENTS

Figure 2:
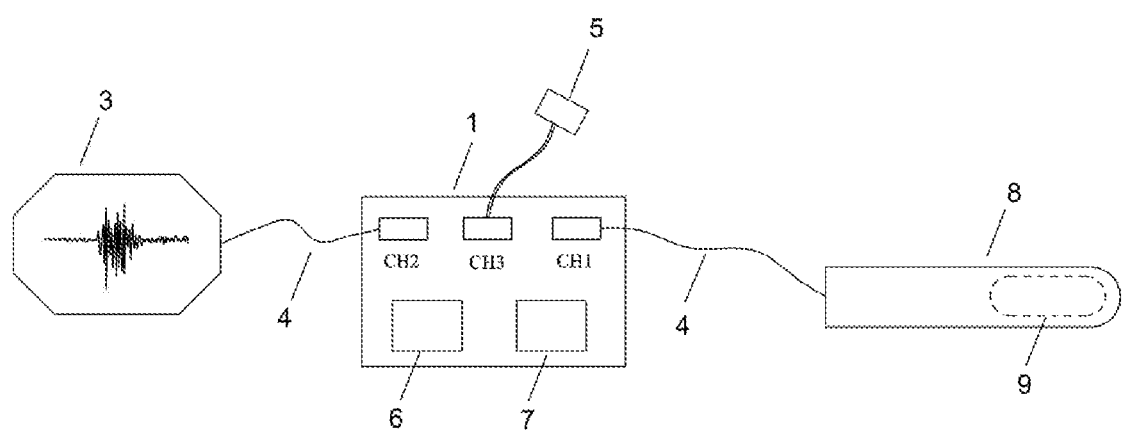
FIG. 2 is a schematic diagram of the detection device according to embodiments of the present disclosure.
Figure 3:
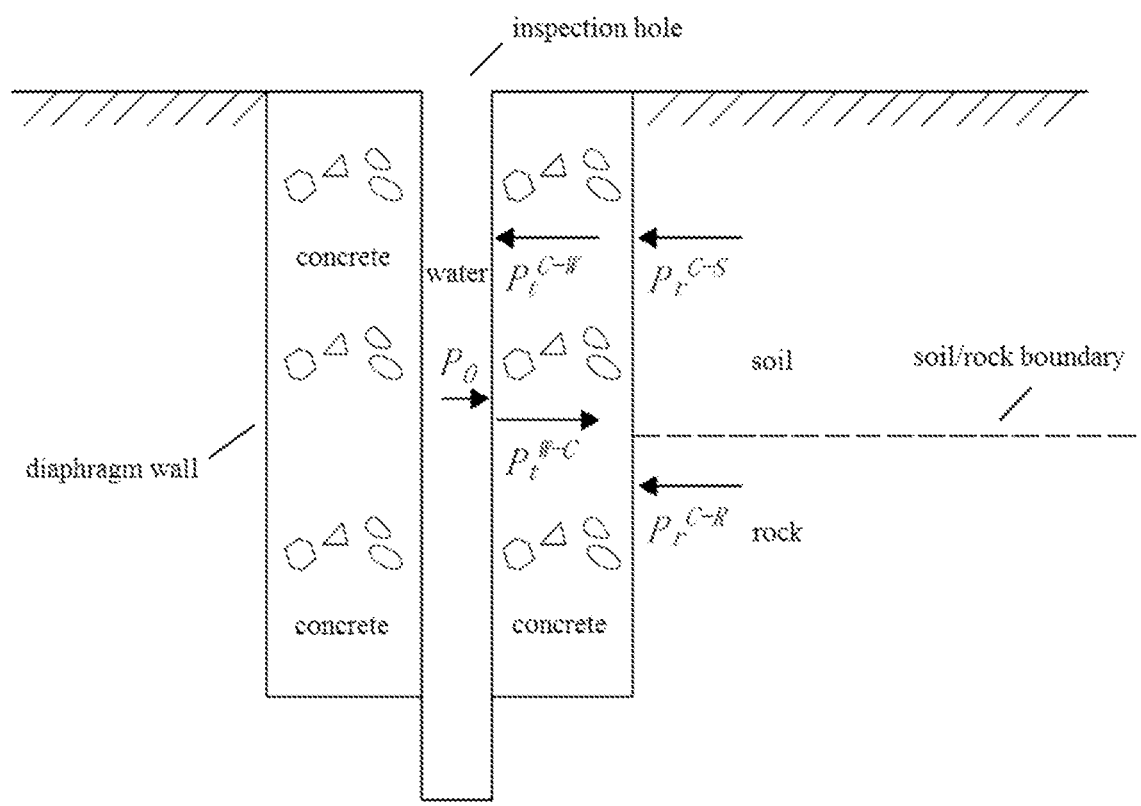
FIG. 3 is a schematic diagram of propagation paths of ultrasonic waves in a inspection hole of the diaphragm wall according to embodiments of the present disclosure.
Figure 4:
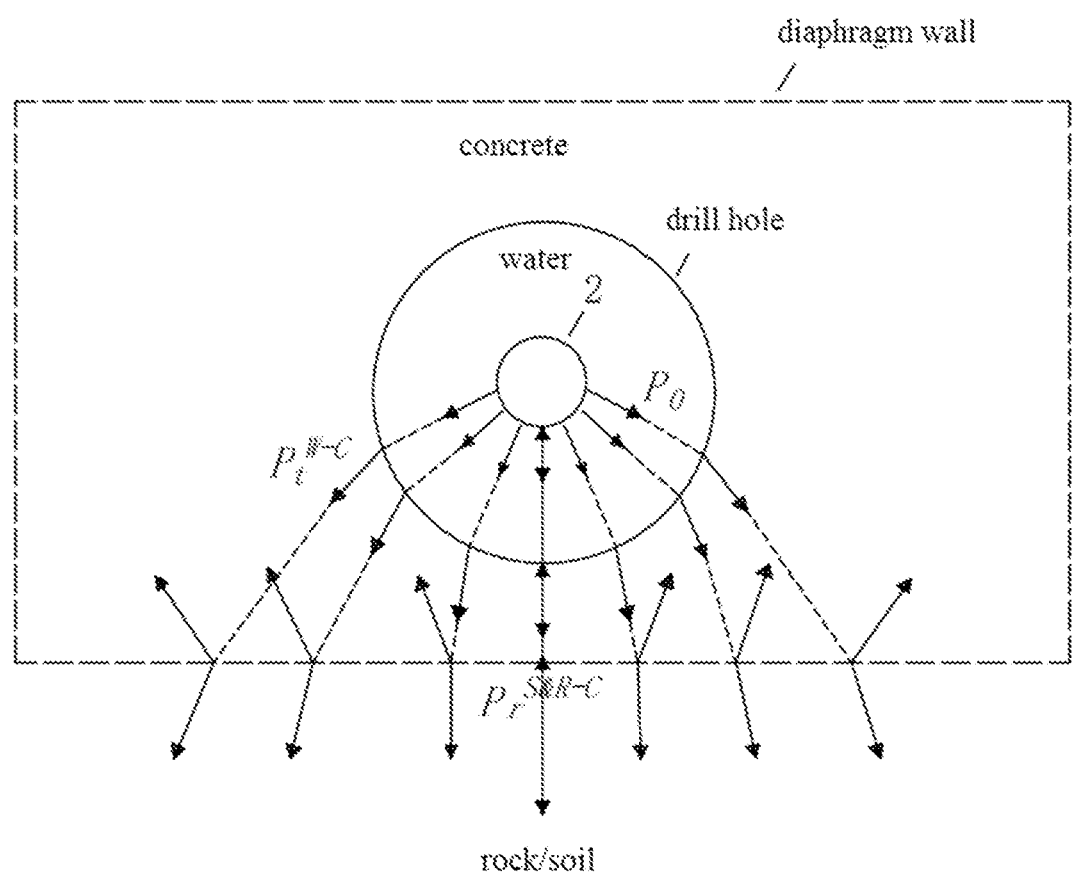
FIG. 4 is a schematic diagram of transmission and reflection of the ultrasonic waves in the inspection hole of the diaphragm wall according to embodiments of the present disclosure.

As shown in FIGS. 1-4, the present embodiments provide a single-hole ultrasonic detection device for continuous integrity and a rock entry depth of a concrete diaphragm wall.

The single-hole ultrasonic detection device includes an apparatus host 1, an ultrasonic transducer 2 and an ultrasonic signal feedback device 3, the apparatus host 1 is respectively connected to the ultrasonic transducer 2 and the ultrasonic signal feedback device 3 via a corresponding one of signal lines, the apparatus host 1 is configured as an ultrasonic transmission and reception device, the ultrasonic transmission and reception device includes an ultrasonic transmitter 7 and an ultrasonic signal collector 6, the ultrasonic transmitter 7 is configured to generate ultrasonic waves and the ultrasonic waves are transmitted via the ultrasonic transducer 2, the ultrasonic transducer 2 is configured to collect and recover a reflected wave of the ultrasonic waves, convert signals of the reflected wave of the ultrasonic waves into electric signals, and send the electric signals back into the ultrasonic transmission and reception device, the ultrasonic signal feedback device 3 performs analysis and calculation by identifying the reflected wave of the ultrasonic waves to obtain an acoustic impedance parameter of a target medium, so as to identify information of an encountered medium during a propagation of the ultrasonic waves. The target medium may be at least one of concrete, rocks and soil, and the encountered medium may be at least one of concrete, rocks and soil.

The apparatus host 1 includes three sockets, which includes a transmission and reception socket CH1, a data feedback socket CH2 and a charging socket CH3. The ultrasonic transducer 2 is connected to the apparatus host 1 through a first signal line of the signal lines 4 via the transmission and reception socket CH1, and the ultrasonic signal feedback device 3 is connected to the apparatus host 1 through a second signal line of the signal lines 4 via the data feedback socket CH2, a signal collected by the apparatus host 1 is transmitted into the ultrasonic signal feedback device 3 through the data feedback socket CH2, so as to realize calculation, analysis, storage and display functions of a sound pressure, an acoustic impedance and a waveform signal, wherein the apparatus host 1 is connected to a charger via the charging socket CH3 to realize a power supply of the apparatus host 1. The ultrasonic signal feedback device 3 is a mobile PC apparatus, and includes a CPU and an independent display screen. An ultrasonic electrical signal is transmitted to the ultrasonic signal feedback device 3 via the apparatus host 1, and the ultrasonic signal feedback device 3 integrates an initial analysis function of an ultrasonic echo signal by using a dedicated analysis software. The initial analysis function mainly includes calculation and conversion of a sound pressure value and an acoustic impedance, analysis of a waveform signal, storage and display functions. A wave amplitude and a frequency of transmitting an ultrasonic wave can be adjusted according to the situation of collecting a feedback signal, so as to improve the recognition rate of an ultrasonic wave signal.

The ultrasonic transducer 2 is provided with an ultrasonic flat probe 8, and a front of the ultrasonic flat probe 8 is provided with an acoustic lens with a cylindrical surface 9. In contrast to the conventional planar lens and the concave lens for improving focusing function, the acoustic lens with the cylindrical surface is used to facilitate scattering of the ultrasonic waves. Furthermore, the curvature of the acoustic lens with the cylindrical surface is in consistent with that of the detection hole as far as possible, so that the ultrasonic wave is incident in such a manner that it is perpendicular to the wall of the detection hole as possible, thereby facilitating the discovery of a first secondary echo. So, the closest distance is identified, thereby greatly reducing interference of the secondary echoes, and facilitating the reflection of the overall condition of primary echoes.

The ultrasonic transmission and reception device uses ultrasonic sound pressure information as the collection and identification information. By means of a piezoelectric ceramic in the ultrasonic transducer 2, mutual conversion between an ultrasonic signal and an electrical signal is realized. The collected sound pressure information is used for identifying medium information encountered during the propagation of ultrasonic waves by calculating an acoustic impedance parameter. The continuity integrity of the concrete diaphragm wall is identified according to the changes of the primary echo sound pressure along with a change of a depth, and the position of a soil-rock interface at a side of concrete diaphragm wall is determined according to the mutation condition of the secondary echo sound pressure along with the change of the detection depth. A depth position of a bottom of the concrete diaphragm wall is judged according to whether to generate a second echo. And, a rock entry depth is calculated according to the detected position of the soil-rock interface and the depth position of the bottom of the concrete diaphragm wall.

A single-hole ultrasonic detection method for continuous integrity and a rock entry depth of a concrete diaphragm wall is provided, and the single-hole ultrasonic detection method is carried out by the single-hole ultrasonic detection device described above. The method includes the following steps S1 to S5.

In step S1, an inspection hole is drilled on a top of the concrete diaphragm wall, the depth of the inspection hole should be greater than the actual depth of the concrete diaphragm wall. The depth of the inspection hole exceeding the bottom of the wall is not less than 50 cm, which is determined according to the taken core sample. The washing and the cleaning on the inside of the inspection hole and the cleaning of the surface of the hole wall are ensured.

In step S2, Water is injected into the inspection hole to ensure that an interior of the inspection hole is fully filled with the water. The water in the inspection hole serves as an ultrasonic wave propagation medium, which facilitates the stable transmission of the sound pressure of the ultrasonic waves and improves the excitation and collection rate of ultrasonic waves.

In step S3, The apparatus host 1 is connected with the ultrasonic transducer 2 and the ultrasonic signal feedback device 3 respectively via the corresponding one of signal lines 4, and the ultrasonic transducer 2 is placed into the inspection hole slowly. Scales is marked on the signal lines previously by a tape. As the ultrasonic transducer 2 is lowered from an orifice to a bottom of the inspection hole, the ultrasonic flat probe 8 is located, which included in the ultrasonic transducer 2, at a central position in the inspection hole, an emission direction of the ultrasonic waves being perpendicular to a longitudinal axis of the concrete diaphragm wall is ensured. The excitation and collection operation of the ultrasonic are performed on the apparatus host 1, the sampling frequency of the ultrasonic wave suitable for a medium of a rock-soil or concrete material is generally selected to be 30-50 MHz, and the lowering is paused once every 10-20 cm to perform excitation and collection. A target medium acoustic impedance value Zi in each pause is calculated and analyzed by means of the ultrasonic signal feedback device 3, and the data is stored after the collection is completed.

In step S4, The collected and reflected echo signals is calculated by the ultrasonic signal feedback device 3, and the acoustic impedance value Zi of target medium in each pause is analyzed. The continuity integrity of the concrete diaphragm wall is identified according to the changes of the sound pressure of the primary echo along with a change of the rock entry depth, and a position of a bedrock surface at a side of the concrete diaphragm wall is determined according to whether the sound pressure of the secondary echo suddenly changes, a depth to a bottom of the concrete diaphragm wall is determined according to whether to generate a second echo, and the continuous integrity and the rock entry depth of the concrete diaphragm wall are determined.

In step S5, The acoustic impedance information of the target medium stored in the ultrasonic signal feedback device 3 is imported into a computer included in the apparatus host 1, and a deep analysis is performed by means of an analysis software of the computer. For example, this deep analysis may be a sketch for a shape and an outline of the diaphragm wall, statistics of the layering of the rock-soil medium surrounding the diaphragm wall, and complex analysis works such as space spreading shape of the rock-soil mass surrounding the diaphragm wall, so as to direct both the construction and the quality detection work of the diaphragm wall.

In this embodiment, the conductive medium is water, and is not limited to water.

Since acoustic impedances of water and concrete are predetermined values, a relational expression of an acoustic impedance of a medium at the side of the concrete diaphragm wall and the sound pressure of the primary echo, the sound pressure of the secondary echo, or another relational expression of the acoustic impedance of the medium at the side of the concrete diaphragm wall and a ratio of the sound pressure of the primary echo to the sound pressure of the secondary echo can be calculated. The medium at the side of the concrete diaphragm wall refers to a medium around the concrete diaphragm wall. A sound pressure detected by the single-hole ultrasonic device is determined by following formula 1.

$$P = \sqrt{\frac{1}{N}\sum_{n=1}^{N} x^2(n)} \qquad \text{formula 1}$$

P is a value of the sound pressure detected by the single-hole ultrasonic detection device, the sound pressure detected by the single-hole ultrasonic detection device refers to any of the sound pressure of the primary echo, the sound pressure of the secondary echo, the sound pressure of the reflected wave, the sound pressure of the transmitted wave, the sound pressure of an incident wave, N is a number of time domain sampling points, and x(n) is a standardized value of the time domain sampling points.

$$Z_i = \rho_i c_i \qquad \text{formula 2}$$

A sound pressure of the reflected wave of the ultrasonic waves is determined by following formula 3.

$$P_r = P_0 \frac{Z_2 - Z_1}{Z_2 + Z_1} \qquad \text{formula 3}$$

A sound pressure of a transmitted wave of the ultrasonic waves is determined by following formula 4.

$$P_t = P_0 \frac{2Z_2}{Z_2 + Z_1} \qquad \text{formula 4}$$

$P_r$ is a value of the sound pressure of the reflected wave, Pt is a value of the sound pressure of the transmitted wave, $P_0$ is a sound pressure value of an incident wave, $Z_1$ is an acoustic impedance of a medium before being incident, $Z_2$ is an acoustic impedance of the medium after being incident, ρ is a density of a propagation medium, and c is a wave velocity of the propagation medium. The medium before being incident is a medium before the ultrasonic wave incident on a boundary, the medium after being incident is a medium after the ultrasonic wave incident on the boundary. The boundary may be a concrete/soil boundary or a concrete/rock boundary.

Based on the sound pressure value of the incident wave $P_0$ and a value $P_1$ of the sound pressure of the primary echo collected, an acoustic impedance of the primary echo at each stage of medium propagation can be calculated and obtained by following formula 5.

$$Z_{i1} = \frac{P_0 + P_1}{P_0 - P_1} Z_W \quad \text{formula 5}$$

$Z_{i1}$ is a value of the acoustic impedance of the primary echo.

Based on the sound pressure value of the incident wave $P_0$ and a value $P_2$ of the sound pressure of the secondary echo collected at each stage, an acoustic impedance of the secondary echo at each stage of ultrasonic wave propagation can be calculated and obtained by following formula 6.

$$Z_{i2} = \left[ \frac{4P_0 Z_W Z_C + P_2(Z_W + Z_C)^2}{4P_0 Z_W Z_C - P_2(Z_W + Z_C)^2} \right] Z_C \quad \text{formula 6}$$

$Z_{i2}$ is a value of the acoustic impedance of the secondary echo, $P_0$ is the sound pressure value of the incident wave, $P_2$ is the value of the sound pressure of the secondary echo measured by the single-hole ultrasonic detection device, $Z_W$ is an acoustic impedance of the water, and $Z_C$ is an acoustic impedance of the concrete.

The continuity integrity of the concrete diaphragm wall is identified based on the sound pressure of the primary echo; a position of soil medium interface at the side of the concrete diaphragm wall is determined based on whether the sound pressure of the secondary echo suddenly changes, a position of the bottom of the concrete diaphragm wall is determined based on whether to generate the second echo, and the rock entry depth is calculated by following formula 7 and formula 8.

$$|Z_{i+1} - Z_i| \geq \varepsilon \quad \text{formula 7}$$

$$L_r = L_0 - L_i \quad \text{formula 8}$$

$\varepsilon$ is an impedance change threshold selected based on a medium impedance value and field experience; $L_r$ is the rock entry depth of the concrete diaphragm wall, $L_0$ is a depth of the concrete diaphragm wall without the secondary echo, and $L_i$ is a depth of the concrete diaphragm wall under a sudden change of the secondary echo.

In the present embodiments, by drilling the inspection hole in the diaphragm wall, the object of detecting continuous integrity and rock entry depth of the wall can be achieved at the same time by collection for one time. The ultrasonic waves are excited in the inspection hole by the ultrasonic transmission and reception device and the ultrasonic transducer. The sound pressures of the ultrasonic waves reflected back are collected and recovered by the ultrasonic transducer and the ultrasonic signal collector 6. Analysis is performed by identifying a reflected echo signal via the ultrasonic signal feedback device to calculate and obtain a sound resistance parameter thereof, thereby identifying medium information encountered during the propagation of the ultrasonic waves. Accordingly, the continuous integrity of the concrete diaphragm wall is estimated and the rock entry depth is calculated.

The present embodiments are different from a traditional method for detecting the rock entry depth of the concrete diaphragm wall. The traditional method needs to perform a continuous integrity analysis of the wall by taking core samples, and to determine a rock entry depth of the concrete diaphragm wall by drilling for two times. To reflect the continuity and integrity of the wall through the core samples, it needs to greatly improve the adoption rate of the core samples, and to drill for two times. So, the detection time and cost are increased in a multiple manner, and the wall quality of a missing position of the core sample cannot be accurately determined. The present embodiments are different from a traditional ultrasonic detection device in which a medium condition is reflected by a wave velocity. In the present embodiments, a pressure value of an ultrasonic sound is collected. By means of the relationship between the ultrasonic sound pressure value and the acoustic impedance information of the target medium, the identification of the medium information and the calculation of the rock entry depth of the concrete diaphragm wall are realized. By improving the probe of the ultrasonic transducer, unlike the conventional planar lens and the concave lens for improving a focusing function, a cylindrical surface lens having the same curvature as that of the inspection hole is used to ensure that the emitted ultrasonic waves are incident in a such manner that it is perpendicular to the wall of the hole. It is beneficial to find the first secondary echo, thereby identifying a nearest distance and greatly reducing interference of the secondary echo.

Finally, it should be noted that the above description is only the preferred embodiments of the present disclosure, and is not intended to limit the present disclosure. Although the present disclosure is described in detail with reference to the foregoing embodiments, for those skilled in the art, the present disclosure can still make modifications to the technical solutions described in the foregoing embodiments, or make equivalent replacements to some technical features thereof. Any modifications, equivalent replacements, improvements and the like made within the spirit and principle of the present disclosure shall belong to the protection scope of the present disclosure.

What is claimed is:

1. A single-hole ultrasonic detection device for continuous integrity and a rock entry depth of a concrete diaphragm wall, the single-hole ultrasonic detection device comprising:
   an apparatus host, an ultrasonic transducer and an ultrasonic signal feedback device, wherein the apparatus host is respectively connected to the ultrasonic transducer and the ultrasonic signal feedback device via a corresponding one of signal lines, the apparatus host is configured as an ultrasonic transmission and reception device, the ultrasonic transmission and reception device comprises an ultrasonic transmitter and an ultrasonic signal collector, the ultrasonic transmitter is configured to generate ultrasonic waves and the ultrasonic waves are transmitted via the ultrasonic transducer, the ultrasonic transducer is configured to collect and recover a reflected wave of the ultrasonic waves, convert signals of the reflected wave of the ultrasonic waves into electric signals, and send the electric signals back into the ultrasonic transmission and reception device, the ultrasonic signal feedback device performs analysis and calculation by identifying the reflected wave of the ultrasonic waves to obtain an acoustic impedance value of a target medium, so as to identify information of an encountered medium during a propagation of the ultrasonic waves.

2. The single-hole ultrasonic detection device for continuous integrity and a rock entry depth of a concrete diaphragm wall according to claim 1, wherein, the ultrasonic transducer is provided with an ultrasonic flat probe, and a front of the ultrasonic flat probe is provided with an acoustic lens with a cylindrical surface.

3. The single-hole ultrasonic detection device for continuous integrity and a rock entry depth of a concrete diaphragm wall according to claim 1, wherein, the apparatus host comprises three sockets, which comprises a transmission and reception socket CH1, a data feedback socket CH2 and a charging socket CH3, the ultrasonic transducer is connected to the apparatus host through a first signal line of the signal lines via the transmission and reception socket CH1, and the ultrasonic signal feedback device is connected to the apparatus host through a second signal line of the signal lines via the data feedback socket CH2, a signal collected by the apparatus host is transmitted into the ultrasonic signal feedback device through the data feedback socket CH2, so as to realize calculation, analysis, storage and display functions of a sound pressure, an acoustic impedance and a waveform signal, wherein the apparatus host is connected to a charger via the charging socket CH3 to realize a power supply of the apparatus host.

4. A single-hole ultrasonic detection method for continuous integrity and a rock entry depth of a concrete diaphragm wall, the single-hole ultrasonic detection method being carried out by a single-hole ultrasonic detection device, the single-hole ultrasonic detection device comprising:
an apparatus host, an ultrasonic transducer and an ultrasonic signal feedback device, wherein the apparatus host is respectively connected to the ultrasonic transducer and the ultrasonic signal feedback device via a corresponding one of signal lines, the apparatus host is configured as an ultrasonic transmission and reception device, the ultrasonic transmission and reception device comprises an ultrasonic transmitter and an ultrasonic signal collector, the ultrasonic transmitter is configured to generate ultrasonic waves and the ultrasonic waves are transmitted via the ultrasonic transducer, the ultrasonic transducer is configured to collect and recover a reflected wave of the ultrasonic waves, convert signals of the reflected wave of the ultrasonic waves into electric signals, and send the electric signals back into the ultrasonic transmission and reception device, the ultrasonic signal feedback device performs analysis and calculation by identifying the reflected wave of the ultrasonic waves to obtain an acoustic impedance value of a target medium, so as to identify information of an encountered medium during a propagation of the ultrasonic waves;
the single-hole ultrasonic detection method comprising:
drilling an inspection hole on a top of the concrete diaphragm wall;
injecting a conducting medium into the inspection hole to ensure that an interior of the inspection hole is fully filled with the conducting medium;
connecting the apparatus host with the ultrasonic transducer and the ultrasonic signal feedback device respectively via the corresponding one of signal lines, and placing the ultrasonic transducer into the inspection hole slowly; marking scales on the signal lines previously by a tape, as lowering the ultrasonic transducer from an orifice to a bottom of the inspection hole; locating a ultrasonic flat probe, which comprised in the ultrasonic transducer, at a central position in the inspection hole, so as to ensure that an emission direction of the ultrasonic waves is perpendicular to a longitudinal axis of the concrete diaphragm wall; pausing the lowering once every 10-20 cm, performing excitation and identification of the ultrasonic waves, and calculating and analyzing the acoustic impedance value $Z_i$ of the target medium in each pause by means of the ultrasonic signal feedback device; and storing data after collecting the acoustic impedance value;
calculating collected and reflected echo signals by the ultrasonic signal feedback device, and analyzing the acoustic impedance value $Z_i$ of the target medium in each pause, judging the continuity integrity of the concrete diaphragm wall based on a change of a sound pressure of a primary echo along with a change of the rock entry depth, and determining a position of a bedrock surface at a side of the concrete diaphragm wall based on whether a sound pressure of a secondary echo suddenly changes, determining a depth to a bottom of the concrete diaphragm wall based on whether to generate the secondary echo, and determining the continuous integrity and the rock entry depth of the concrete diaphragm wall; and
importing the acoustic impedance value $Z_i$ of the target medium stored in the ultrasonic signal feedback device into an analysis software comprised in the ultrasonic signal feedback device, and performing a deep analysis by means of the analysis software.

5. The single-hole ultrasonic detection method for continuous integrity and a rock entry depth of a concrete diaphragm wall according to claim 4, wherein, the conducting medium is water.

6. The single-hole ultrasonic detection method for continuous integrity and a rock entry depth of a concrete diaphragm wall according to claim 5, wherein,
calculating a relational expression of an acoustic impedance of a medium at the side of the concrete diaphragm wall and the sound pressure of the primary echo, the sound pressure of the secondary echo, or another relational expression of the acoustic impedance of the medium at the side of the concrete diaphragm wall and a ratio of the sound pressure of the primary echo to the sound pressure of the secondary echo, based on acoustic impedances of both water and concrete that are predetermined values; wherein a sound pressure detected by the single-hole ultrasonic device is determined by, $$P = \sqrt{\frac{1}{N}\sum_{n=1}^{N} x^2(n)}$$

wherein P is a value of the sound pressure detected by the single-hole ultrasonic detection device, N is a number of time domain sampling points, and x(n) is a standardized value of the time domain sampling points;
the acoustic impedance value is determined by $$Z_i = \rho_i c_i$$

a sound pressure of the reflected wave of the ultrasonic waves is determined by $$P_r = P_0 \frac{Z_2 - Z_1}{Z_2 + Z_1}$$

a sound pressure of a transmitted wave of the ultrasonic waves is determined by $$P_t = P_0 \frac{2Z_2}{Z_2 + Z_1}$$

wherein $P_r$ is a value of the sound pressure of the reflected wave, Pt is a value of the sound pressure of the transmitted wave, $P_0$ is a sound pressure value of an incident wave, $Z_1$ is an acoustic impedance of a medium before being incident, $Z_2$ is an acoustic impedance of the medium after being incident, $\rho$ is a density of a propagation medium, and c is a wave velocity of the propagation medium;

based on the sound pressure value of the incident wave $P_0$ and a value $P_1$ of the sound pressure of the primary echo collected, calculating and obtaining an acoustic impedance of the primary echo at each stage of medium propagation by $$Z_{i1} = \frac{P_0 + P_1}{P_0 - P_1} Z_W$$

wherein $Z_{i1}$ is a value of the acoustic impedance of the primary echo;

based on the sound pressure value of the incident wave $P_0$ and a value $P_2$ of the sound pressure of the secondary echo collected at each stage, calculating and obtaining an acoustic impedance of the secondary echo at each stage of ultrasonic wave propagation by $$Z_{i2} = \left[ \frac{4P_0 Z_W Z_C + P_2(Z_W + Z_C)^2}{4P_0 Z_W Z_C - P_2(Z_W + Z_C)^2} \right] Z_C$$

wherein $Z_{i2}$ is a value of the acoustic impedance of the secondary echo, $P_0$ is the sound pressure value of the incident wave, $P_2$ is the value of the sound pressure of the secondary echo measured by the single-hole ultrasonic detection device, $Z_W$ is an acoustic impedance of the water, and $Z_C$ is an acoustic impedance of the concrete;

identifying the continuity integrity of the concrete diaphragm wall based on the sound pressure of the primary echo; determining a position of a soil medium interface at the side of the concrete diaphragm wall based on whether the sound pressure of the secondary echo suddenly changes, determining a position of the bottom of the concrete diaphragm wall based on whether to generate the second echo, and calculating the rock entry depth by $$|Z_{i+1} - Z_i| \geq \varepsilon$$

$$L_r = L_0 - L_i$$

wherein $\varepsilon$ is an impedance change threshold selected based on a medium impedance value; $L_r$ is the rock entry depth of the concrete diaphragm wall, $L_0$ is a depth of the concrete diaphragm wall without the secondary echo, and $L_i$ is a depth of the concrete diaphragm wall under a sudden change of the secondary echo;

estimating the continuous integrity and the rock entry depth of the concrete diaphragm wall based on the acoustic impedance of the primary echo at each stage of medium propagation and the rock entry depth calculated.

7. The single-hole ultrasonic detection method for continuous integrity and a rock entry depth of a concrete diaphragm wall according to claim 4, wherein, the ultrasonic transducer is provided with an ultrasonic flat probe, and a front of the ultrasonic flat probe is provided with an acoustic lens with a cylindrical surface.

8. The single-hole ultrasonic detection method for continuous integrity and a rock entry depth of a concrete diaphragm wall according to claim 4, wherein, the apparatus host comprises three sockets, which comprises a transmission and reception socket CH1, a data feedback socket CH2 and a charging socket CH3, the ultrasonic transducer is connected to the apparatus host through a first signal line of the signal lines via the transmission and reception socket CH1, and the ultrasonic signal feedback device is connected to the apparatus host through a second signal line of the signal lines via the data feedback socket CH2, a signal collected by the apparatus host is transmitted into the ultrasonic signal feedback device through the data feedback socket CH2, so as to realize calculation, analysis, storage and display functions of a sound pressure, an acoustic impedance and a waveform signal, wherein the apparatus host is connected to a charger via the charging socket CH3 to realize a power supply of the apparatus host.

* * * * *